United States Patent [19]

Shang et al.

[11] Patent Number: 5,724,422
[45] Date of Patent: Mar. 3, 1998

[54] ENCRYPTING AND DECRYPTING INSTRUCTION BOUNDARIES OF INSTRUCTIONS IN A SUPERSCALAR DATA PROCESSING SYSTEM

[75] Inventors: Shisheng Shang, Kaohsiung; Chung-Chih Chang, Yun-Lin; Chia-Chang Hsu, Tainan, all of Taiwan

[73] Assignee: Industrial Technology Research Institute, Taiwan

[21] Appl. No.: 693,376

[22] Filed: Aug. 5, 1996

[51] Int. Cl.⁶ .................................................. H04K 1/00
[52] U.S. Cl. ........................................ 380/4; 380/49
[58] Field of Search .................... 380/4, 49, 25

[56] References Cited

U.S. PATENT DOCUMENTS

| | | |
|---|---|---|
| 4,619,265 | 10/1986 | Morgan et al. . |
| 5,202,967 | 4/1993 | Matsuzaki et al. . |
| 5,222,480 | 6/1993 | Couche et al. . |
| 5,337,415 | 8/1994 | DeLano et al. . |
| 5,396,634 | 3/1995 | Zaidi et al. . |
| 5,448,746 | 9/1995 | Eickemeyer et al. . |
| 5,459,844 | 10/1995 | Eickemeyer et al. . |
| 5,544,244 | 8/1996 | Oguru ........................... 380/4 |
| 5,600,726 | 2/1997 | Morgan et al. ............... 380/4 |
| 5,615,381 | 3/1997 | Iijima ........................... 380/4 |

OTHER PUBLICATIONS

Adams, Thomas L. and Zimmerman, Richard E., "An Analysis of 8086 Instruction Set Usage in MS DOS Programs", (excerpt) *1989 ACM 0–89791–300–0/89/0004/ 0152*, pp. *152–160*.

Slater, M., "AMD's K5 Designed to Outrun Pentium," *Microprocessor Report*, 8(14):1, 6–11 Oct. 24, 1994.

Gwennap, L., "Intel's P6 Uses Decoupled Superscalar Design," *Microprocessor Report*, pp. 9–15 Feb. 16, 1995.

*Primary Examiner*—David C. Cain
*Attorney, Agent, or Firm*—Christensen O'Connor Johnson & Kindness PLLC

[57] ABSTRACT

A data processing system for decoding instructions in parallel in a superscalar, complex instruction set computing (CISC) computer. In a training mode of operation, an encrypter 29 encrypts preprocessed instructions retrieved from an instruction cache 26. In a processing mode of operation, instruction information is fetched and decrypted in decrypter 30. A prefetcher 21 separates the fetched instruction according to the decrypted boundary information. An instruction length verifier 25 verifies that the instructions were separated correctly and controls decoders 22a–c according to the verification. If the verification is correct for a given set of instructions, the system processes the instructions in parallel through the decoders to a dispatch logic circuit 23 and then to functional units 24. If the verification is incorrect, those related instructions may be needed to decode serially.

14 Claims, 20 Drawing Sheets

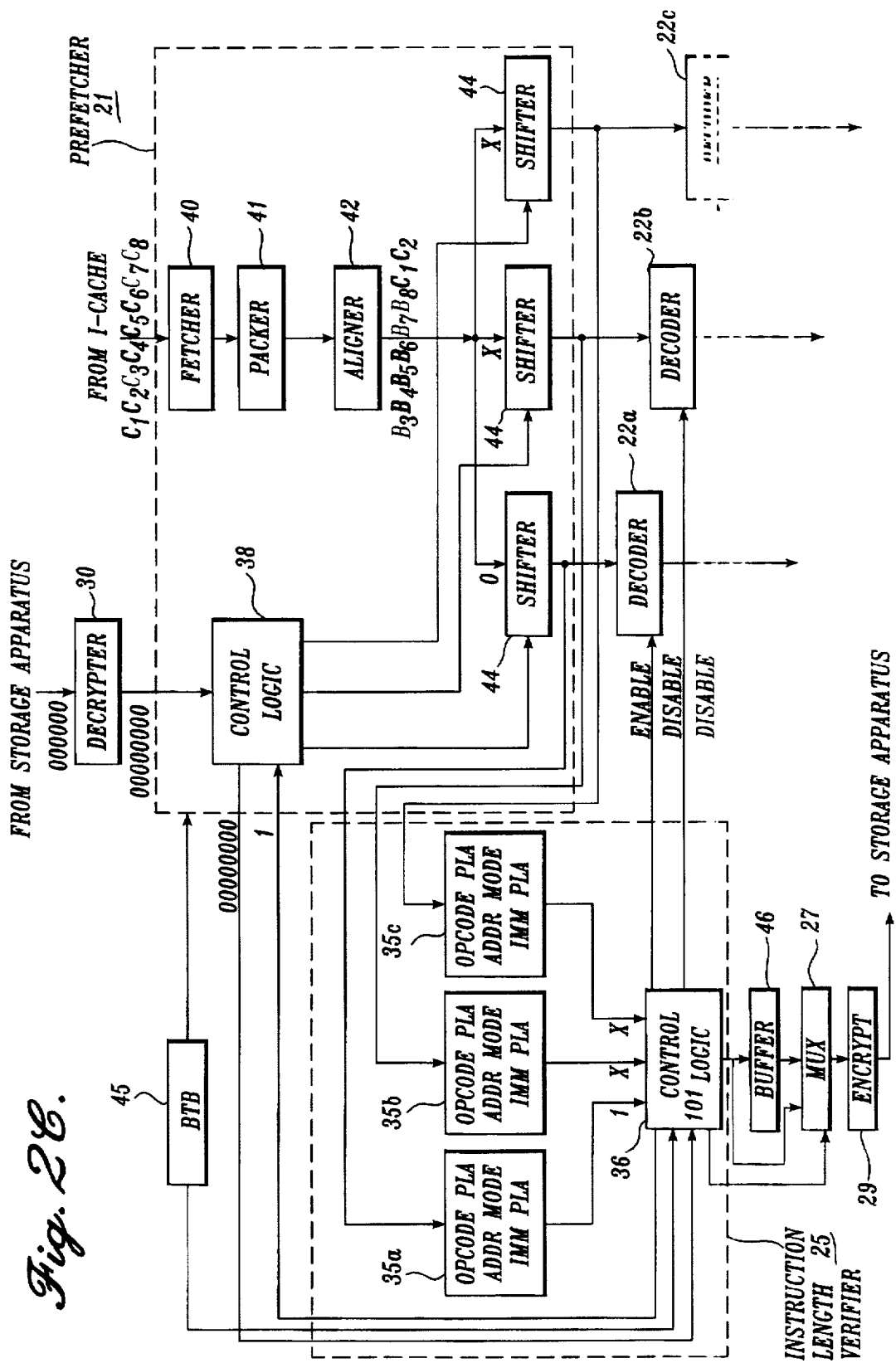

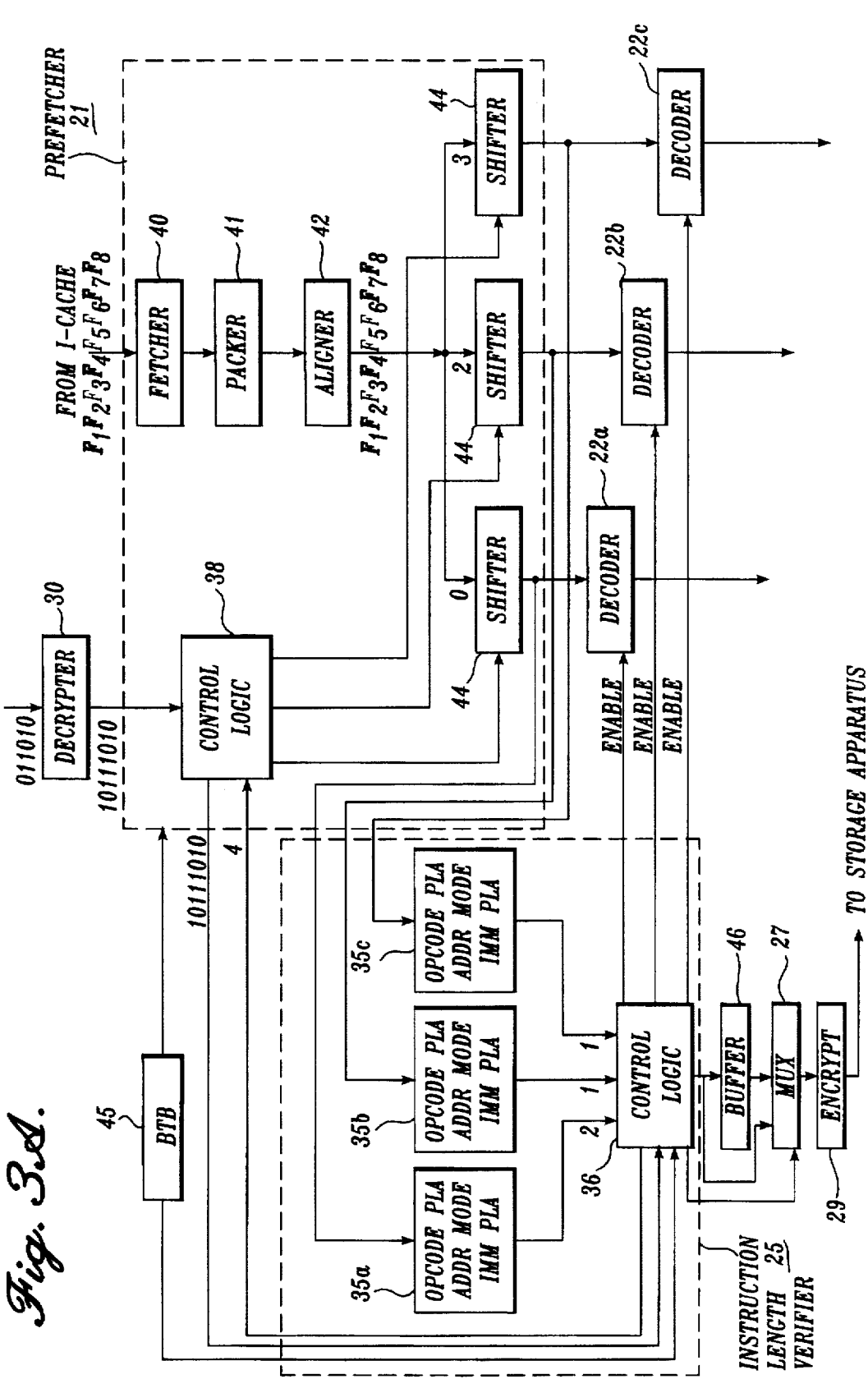

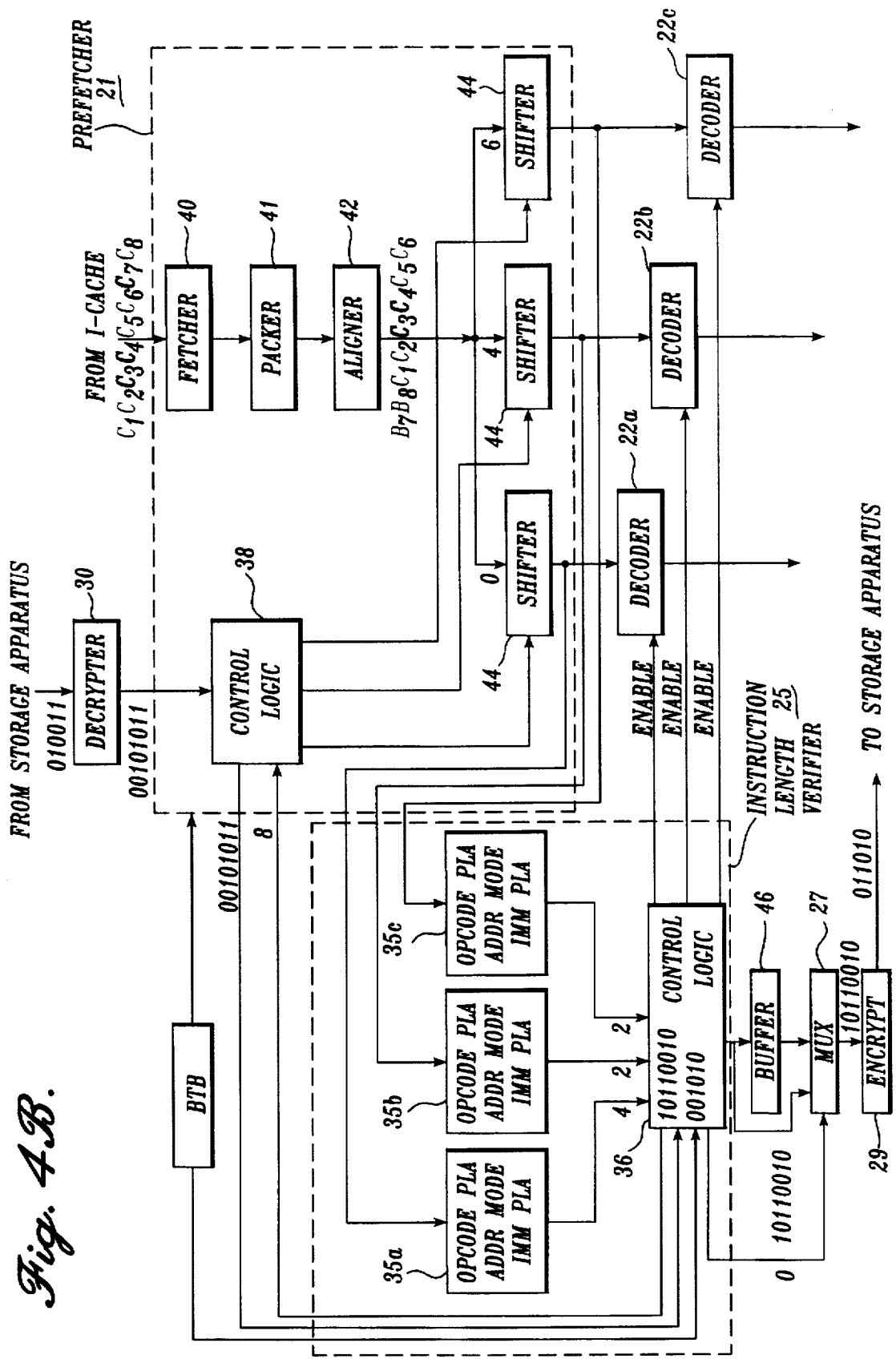

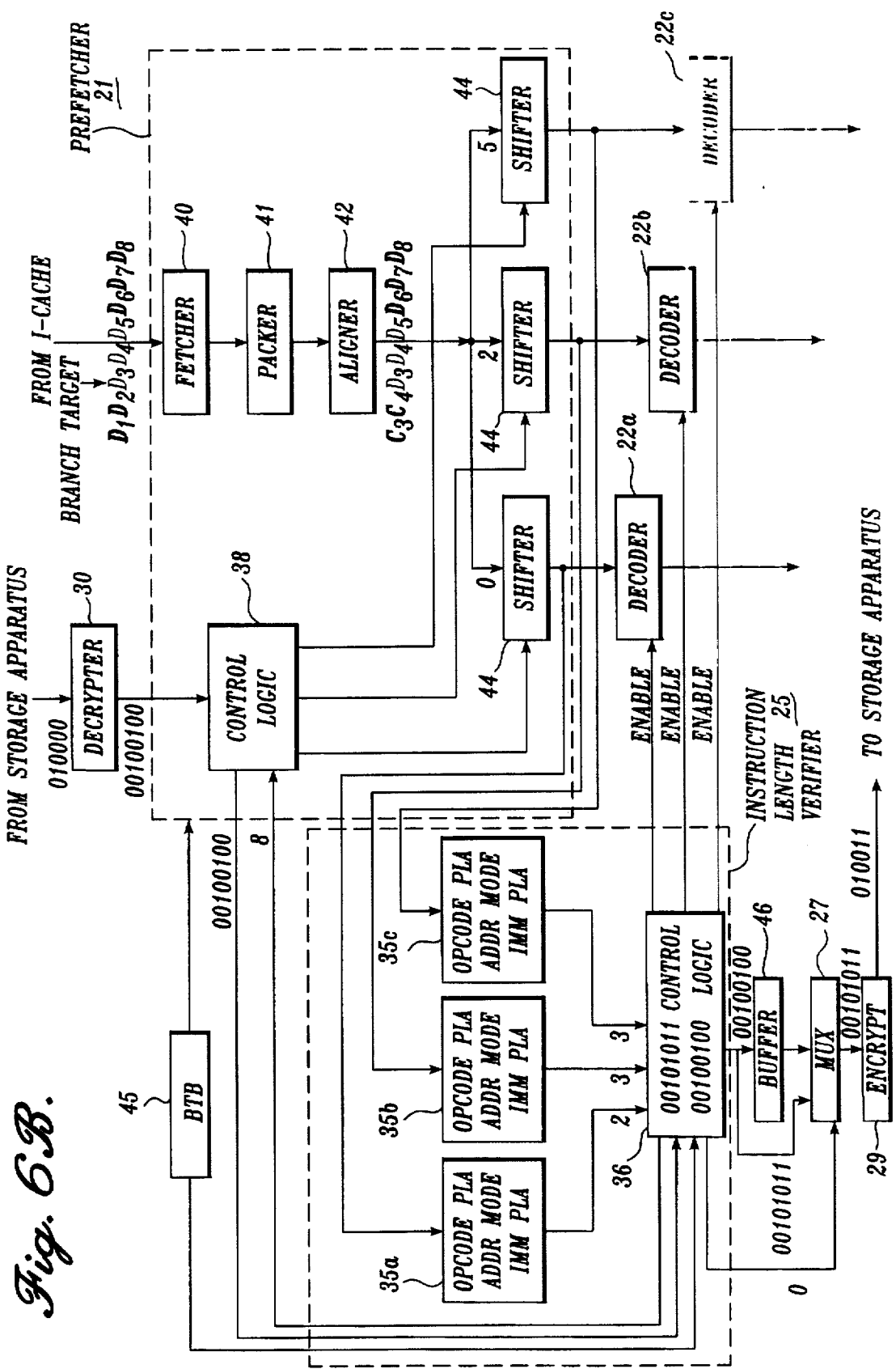

ENCRYPTING AND DECRYPTING INSTRUCTION BOUNDARIES OF INSTRUCTIONS IN A SUPERSCALAR DATA PROCESSING SYSTEM

FIELD OF THE INVENTION

This invention is directed to pipeline data processing systems and, more particularly, to encrypting and decrypting instruction boundaries for parallel decoding of variable-length instructions.

BACKGROUND OF THE INVENTION

Superscalar microprocessor architecture is presently one of the most widely used computer architectures. Superscalar microprocessors enable the execution of multiple instructions per clock cycle. These microprocessors accomplish this function by means of a built-in scheduler that identifies a group of instructions that will not conflict with each other or require simultaneous use of a particular service, and that passes the group along for simultaneous execution. The Intel i960 CA, the first commercially available superscalar processor, is capable of initiating up to three separate instructions in a single clock cycle.

Two types of pipelined, scalar architectures are the reduced instruction set computing (RISC) and the complex instruction set computing (CISC) processors. The instructions in an RISC processor usually have a fixed length, making it easy to decode the instructions in parallel. In contrast, instructions of CISC processors vary in length. RISC and CISC processors become superscalar in design by concurrent instruction execution. Decoding multiple variable length instructions in true parallel is difficult in that the next instruction cannot be decoded until the length of the previous instruction is known. This problem can be solved by using a storage apparatus, augmented to an instruction cache, to record every instruction boundary within each cache line.

As the trend in processor design moves from single-issue scalar to multi-issue superscalar as well as from small to large size instruction caches, efficient and economical decoding of multiple instructions in parallel is required. As instruction caches become larger, the need of larger storage space increases as well. In a variable length instruction system, such as CISC, the instruction boundary pattern requires an inordinate amount of space in the cache. The idea of encrypting and decoding a variable word length instruction does address the issue of decreasing the amount of space the instruction occupies in the cache, see Matsuzaki et al., U.S. Pat. No. 5,202,967. However, this idea does not address the space occupied by the boundary pattern of variable length instructions.

SUMMARY OF THE INVENTION

In accordance with the present invention, a method and apparatus are provided for storing an instruction boundary pattern in reduced space within a cache memory of a computer data processing system. The computer system includes an instruction cache, a boundary pattern storage, an instruction length verifier, an encrypter, a decrypter, a prefetcher and two or more decoders. The computer system also includes plural functional units. The prefetcher fetches a set of instruction signals and a corresponding instruction boundary pattern code from the boundary pattern storage. The decrypter decrypts the fetched instruction boundary pattern code into instruction boundary patterns. The instruction length verifier generates instruction boundary patterns according to said fetched set of instructions, if the corresponding instruction boundary pattern contains no pattern information. The encrypter encrypts the generated instruction boundary patterns into instruction boundary pattern code according to a predetermined criteria and stores said encrypted instruction boundary pattern code in the boundary pattern storage. The prefetcher separates the set of instructions according to the corresponding instruction boundary pattern, if the corresponding instruction boundary pattern contains pattern information. The instruction length verifier verifies if the separated instruction signals were separated correctly. The decoder decodes the correctly separated set of instructions in parallel, if the verification was correct, and the decoder decodes the instructions subsequent to an incorrectly verified instruction serially, if the verification was incorrect.

In accordance with yet other aspects of the present invention, the prefetcher further identifies branch instructions in the fetched set of instructions, determines the target instruction of the identified branch instructions and fetches the target instruction and a corresponding instruction boundary pattern code from the boundary pattern storage.

In accordance with yet other aspects of the present invention, the instruction is one or more byte in length.

In accordance with still other aspects of the present invention, the instructions can be variable in length.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1A:
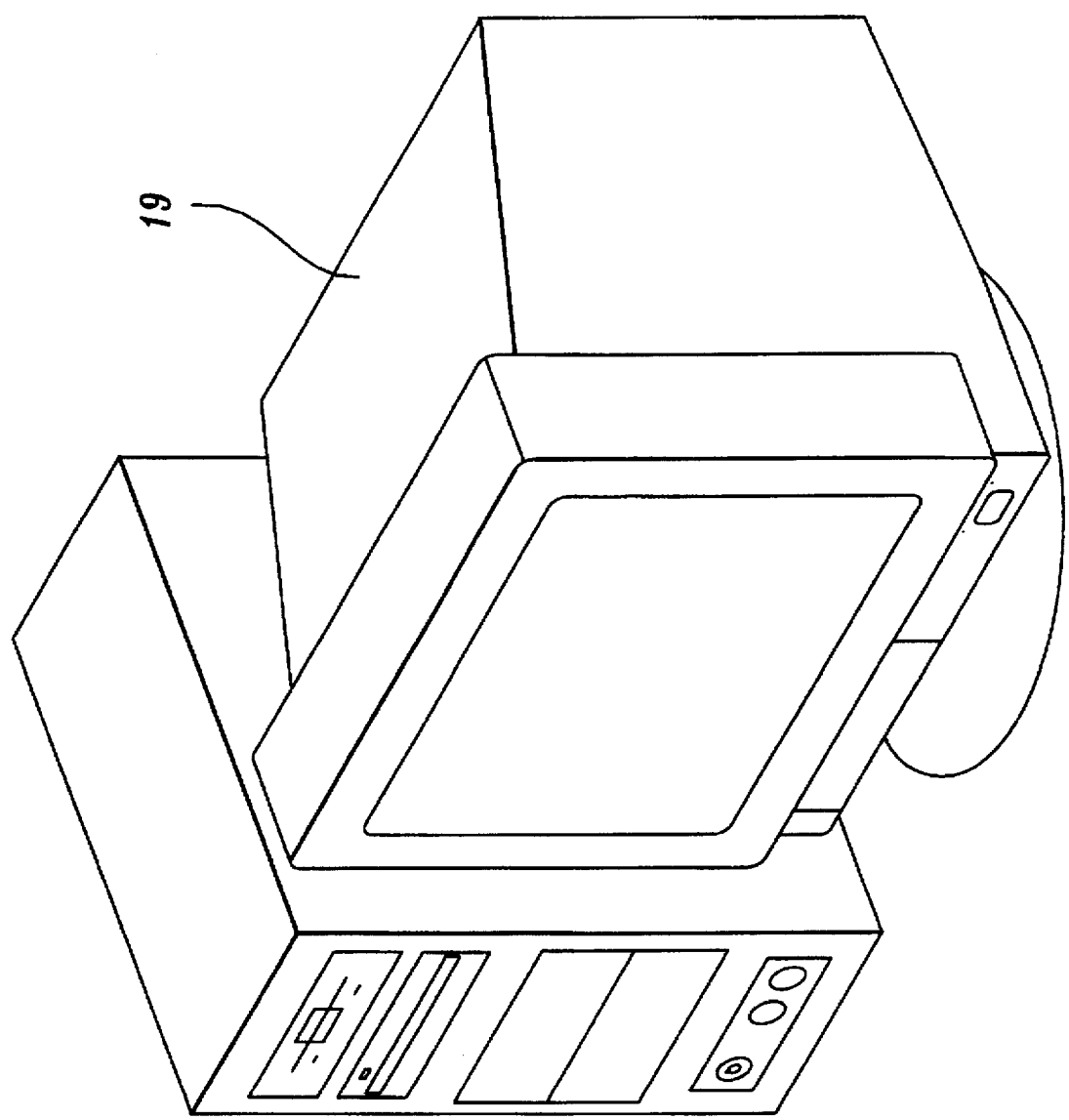
FIG. 1A is an isometric view of a typical desktop personal computer that can perform the data processing of the present invention.

A generally conventional desktop computer 19 with a complex instruction set computing (CISC), superscalar data processing architecture is provided and shown in FIG. 1A.

Figure 1B:
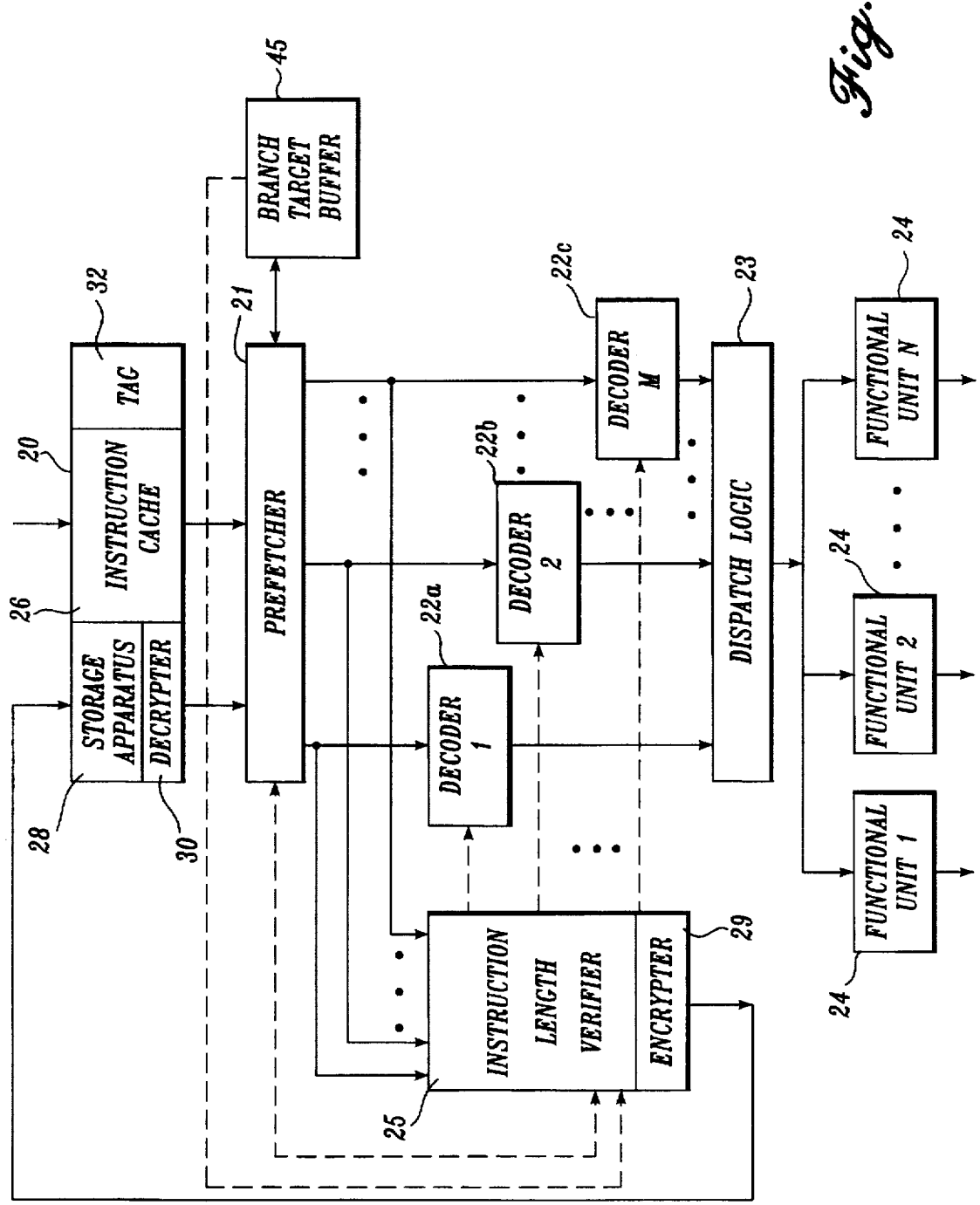
FIG. 1B is a block diagram of the present invention.

FIG. 1B is a block diagram of a preferred embodiment of the data processing system of the present invention. The system includes a cache 20, a prefetcher 21, an instruction length verifier (ILV) 25, an encrypter 29, M (M>1) decoders 22a–c, dispatch logic 23 and N (N>1) functional units 24. The illustrated data processing system is capable of executing two or more instructions in parallel and executing instructions in a degraded serial processing mode.

Cache 20 includes a storage apparatus 28, a decrypter 30, an instruction cache 26 and a tag 32. Data words are sequences of instructions presented on cache lines in the instruction cache 26. The cache line size of a preferred embodiment of the present invention is eight bytes. It can be appreciated by one of ordinary skill that cache line size depends on system requirements and thus can vary greatly. The cache tag 32 contains several bits that indicate if the cache line is valid, dirty, how frequently used, etc. The instruction cache 26 uses the tag information to maintain cache processes. The instruction cache 26 stores recently accessed or frequently accessed instructions. Storage apparatus 28 stores encrypted information relating to an instruction boundary pattern. Decrypter 30 decrypts the encrypted instruction boundary pattern stored in the storage apparatus 28. Also provided is a branch-target buffer (BTB) 45 connected to the ILV 25 and prefetcher 21 for collecting information about the most recently executed branches, indicating whether or not the instruction is a branch instruction, and speculating the branch target if a branch instruction is indicated.

Figure 2A:
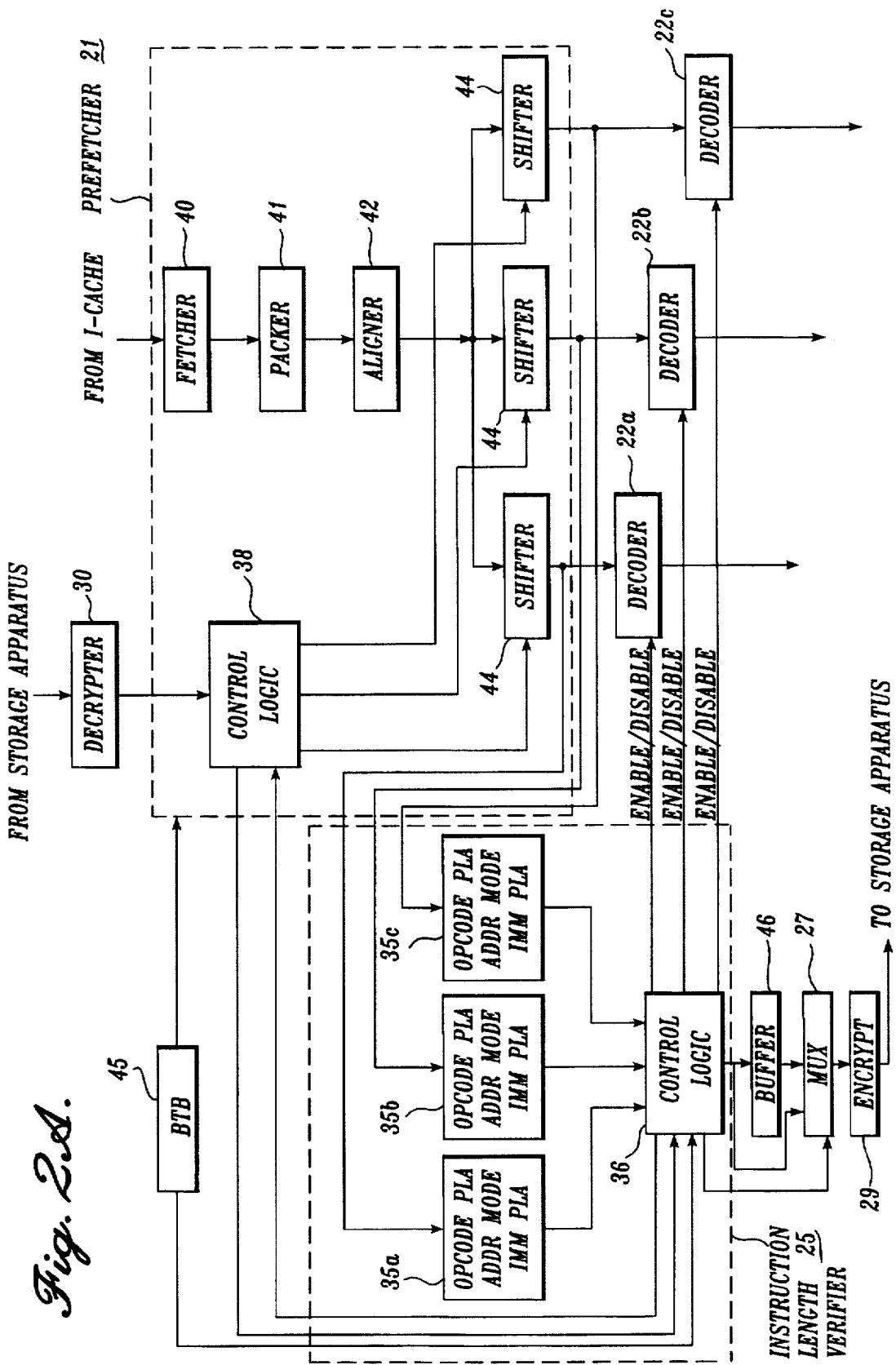
FIGS. 2–6 are functional diagrams detailing step by step functioning performed in the present invention.

FIG. 2A illustrates the internal components of prefetcher 21 and ILV 25. Prefetcher 21 includes a fetcher 40 that outputs to a packer 41 that outputs to an aligner 42. The aligner 42 and control logic 38 input to three shifters 44. Each shifter 44 separately connects to a corresponding decoder 22a–c. ILV 25 includes control logic 36 and operation code program logic arrays (PLA) 35a–c that individually connect to the outputs of each shifter 44 within the prefetcher 21. The PLAs 35a–c include opcode address mode and Imm PLA. The PLAs 35a–c determine the length of a single instruction and opcode, address mode and immediate fields in an instruction. The outputs of PLA 35a–c are received by control logic 36. Control logic 36 communicates with control logic 38, outputs an enable or disable signal to the decoders 22 and outputs instruction boundary pattern to the encrypter 29. Also, a buffer 46 is connected to the control logic 36 and a multiplexer (mux) 27 is connected to the control logic 36, the buffer 46 and the encrypter 29. Buffer 46 and mux 27 are employed for updating the storage apparatus 28.

Prefetcher 21 is the essential controlling component within the architecture. Prefetcher 21 receives instructions and their boundary pattern, parses the instructions and processes instructions in parallel. Each of the decoders 22a–c receives a single instruction from the prefetcher 21 and decodes it. The decoded instructions are then sent to the dispatch logic 23. The dispatch logic 23 determines which end functional unit 24 receives the decoded instruction for execution.

ILV 25 verifies that the prefetcher 21 has performed its task properly according to its received instructions and instruction boundary pattern. Also, the ILV 25 enables or disables the decoders 22a–c according to the verification. The ILV 25 is described in more detail below.

The sequence of data words in the cache line of the present invention is eight bytes in length. The fetcher 40 fetches data words from the instruction cache 26 on a cache line basis. The packer 41 merges instructions from different cache lines for various reasons. One reason is that an instruction may stretch across two cache lines. Another reason occurs if a first instruction requires a branch to an instruction not adjacent to the first instruction. The aligner 42 aligns the beginning of instructions to the shifters 44 and thus the decoders 22a–c. Control logic 38 controls the functions within the prefetcher 21.

At the same time that the fetcher 40 fetches a cache line of data words from the instruction cache 26, the prefetcher 21 fetches a corresponding instruction boundary pattern from the storage apparatus 28 via the decrypter 30. The fetched instruction boundary pattern corresponds to the fetched cache line of data words. The prefetcher 21 parses data words for processing in parallel through decoders 22a–c according to the fetched instruction boundary pattern. The ILV 25 receives the separated instruction information from the prefetcher 21 and verifies if the parsed data words form complete instructions. If the verification was correct, the ILV 25 enables the decoders 22a–c to each decode a single complete instruction. If the verification was incorrect for an instruction and the beginning of the instruction is known, the corresponding decoder is enabled and the following instructions are processed serially until a cache line is correctly verified, see examples in FIGS. 2–6 below.

Before the boundary pattern of the instruction is decrypted, the boundary pattern is encrypted, as shown in the sequential processing example of FIGS. 2B–E. Initially, the system generates an encryption pattern of the instruction boundaries during sequential operation.

TABLE 1

Decryption

| Code | Boundary Pattern (MSB ... LSB) |
|---|---|
| 000 | 0000 |
| 001 | 0001 |
| 010 | 0010 |
| 011 | 1011 |
| 100 | 0100 |
| 101 | 1101 |
| 110 | 0110 |
| 111 | 0111 |

Table 1 illustrates one possible assignment of code to instruction boundary information or pattern determined by the ILV 25. Each bit in the boundary pattern specifies whether a corresponding byte in an instruction cache line is the start of an instruction. If a byte is the start of an instruction, the bit is 1; 0, otherwise. The encryption code of the present invention produces a code of 3 bits. Since three bits can only represent eight different patterns, some instruction boundary pattern will inevitably be lost. This loss is minimized since some instructions are executed more frequently which indicates certain instruction boundary patterns will appear more frequently in the cache lines. The present invention encrypts those frequently occurred patterns and stores them in the storage apparatus 28. Some instruction boundary patterns, as a result, cannot be faithfully represented due to the loss in encryption. But the performance degradation can be well controlled if the encryption takes into account pattern mixes. This means that examining many programs is required in order to identify a good set of code assignments in encryption. Table 2 illustrates the options available to a system designer when deciding the length of the encrypted code as it relates to the byte size of the granule or cache line. U represents the number of lines in the instruction cache and V is the line size in bytes.

TABLE 2

| Granule Size (Bytes) | Length of Code (Bits) | Size of Storage Apparatus (Bits) |
|---|---|---|
| 4 | 2 | 0.5 UV |
|   | 3 | 0.75 UV |
| 8 | 4 | 0.5 UV |
|   | 5 | 0.625 UV |
| 16 | 6 | 0.375 UV |
|   | 7 | 0.4375 UV |
| 32 | 8 | 0.25 UV |
|   | 9 | 0.28125UV |

Figure 2B:
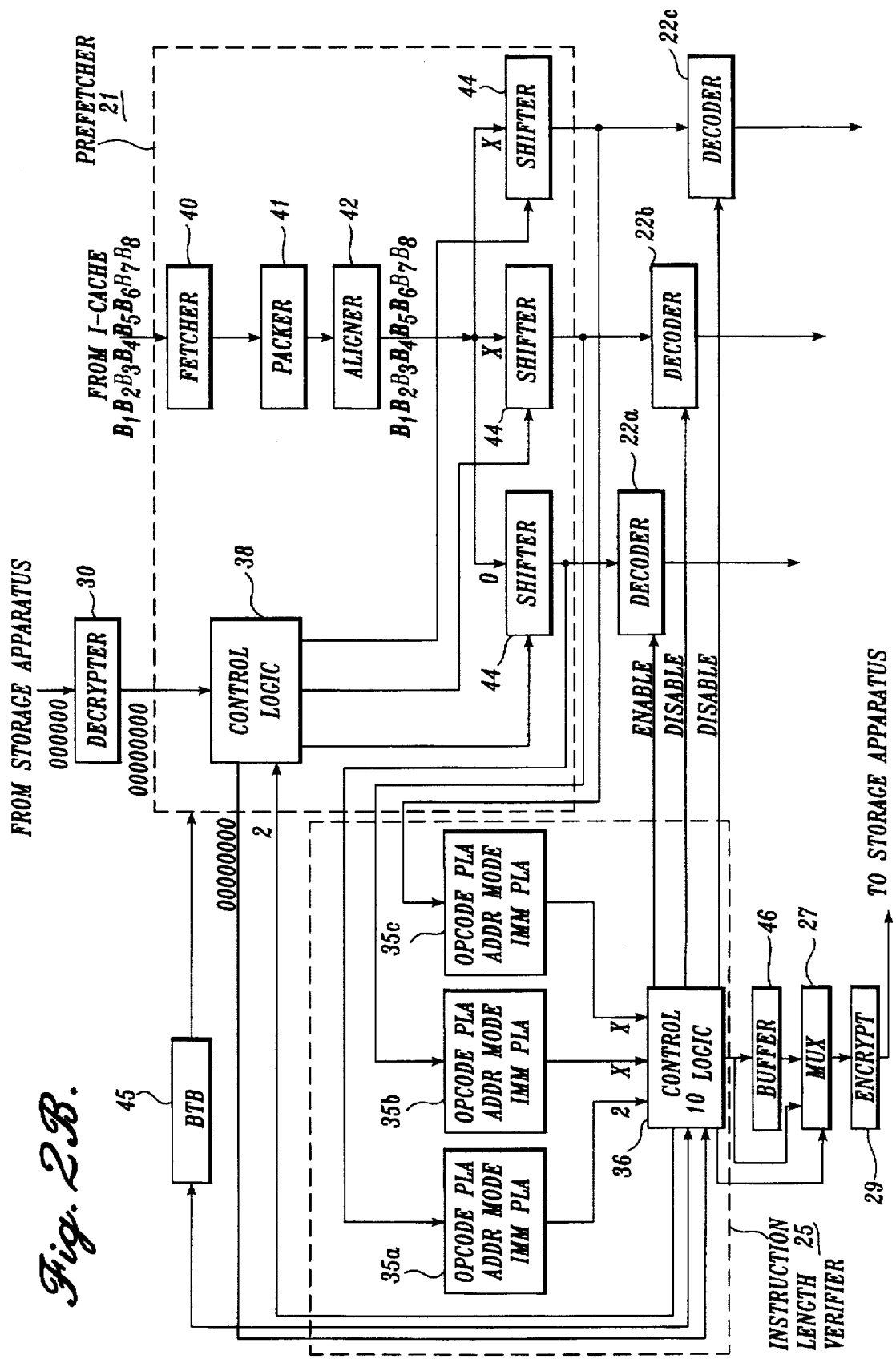

As shown in FIG. 2B, the size of a cache line in instruction cache 26 is eight bytes $B_1$–$B_8$ A first instruction occupies two bytes, $B_1$, $B_2$; the second instruction, one byte, $B_3$; the third instruction three bytes, $B_4$, $B_5$, $B_6$; and the fourth instruction, two bytes, $B_7$, $B_8$. The illustrated change in highlight within the cache lines indicates an instruction change. First, data 000000 is read from the storage apparatus 28 when the cache line is fetched. Since the read data contains no instruction boundary pattern, the control logic 38 in the prefetcher 21 fails to know how to parse the data words fetched and fails to know how to send the data words in the cache line to the appropriate decoders. Therefore, instructions must be handled serially. PLA 35a computes the length of the first instruction $B_1$, $B_2$. The control logic 36 collects in its internal buffer the boundary pattern, 10, of the first instruction and issues an enabling signal to the primary (first) decoder 22a and a disabling signal to the other two decoders 22b, c. The "1" in a boundary pattern indicates that the corresponding byte is the first byte in an instruction. Bytes that correspond to a "0" in the boundary pattern are included in the instruction of the last byte identified as a "1" in the pattern. Decoder 22a then decodes the first instruction and sends the decoded instruction to the dispatcher 23. The computed byte length of the decoded instruction, 2, is fed by control logic 36 to control logic 38 in the prefetcher 21.

Figure 2D:
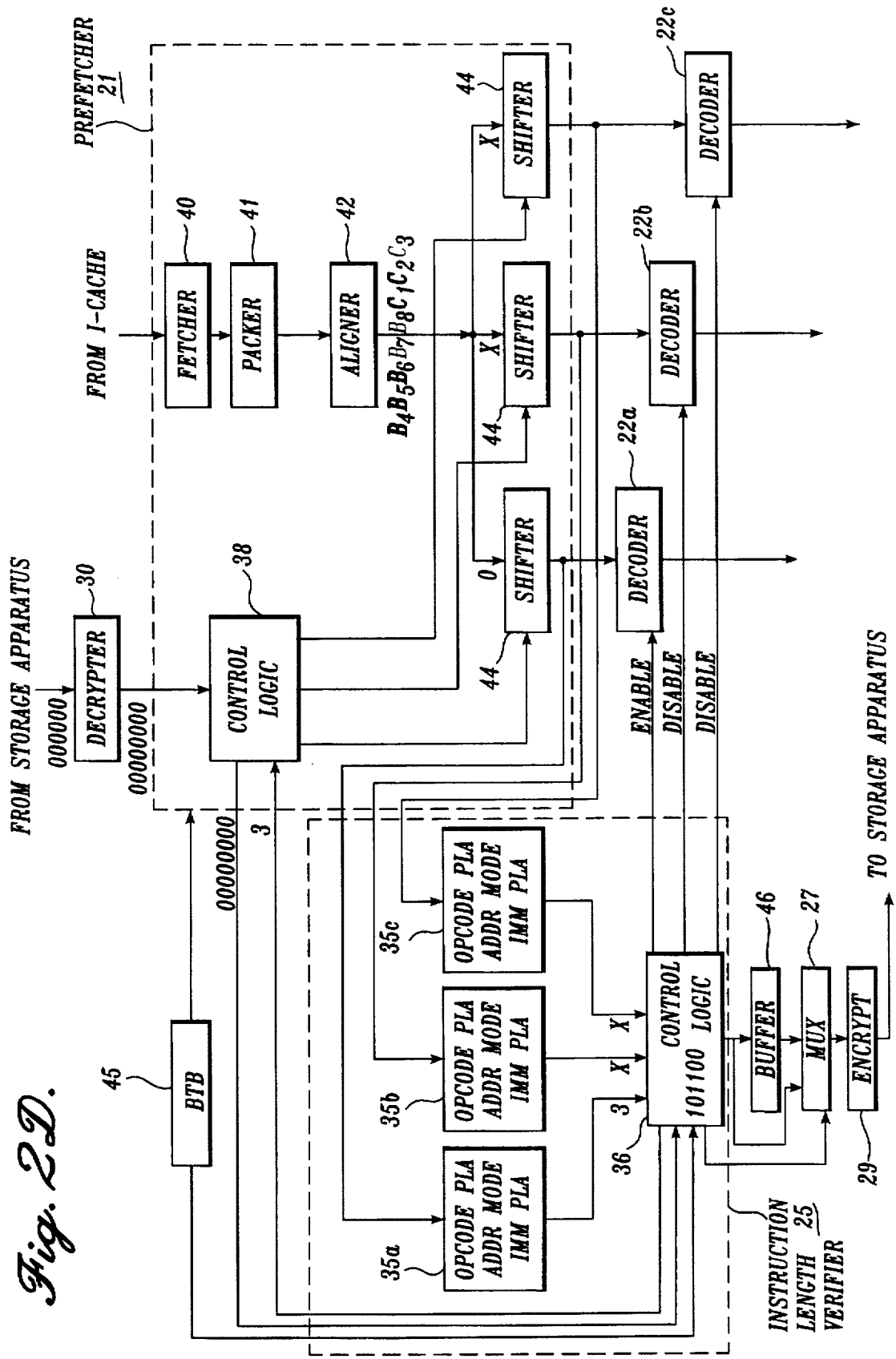

As shown in FIG. 2C by byte $B_3$'s leftmost position in the set of instructions shown under aligner 42, the control logic 38 in the prefetcher 21 parses the data words by left shifting them two bytes according to the received computed byte length of the first instruction. Since the first two bytes $B_1$, $B_2$ are shifted out, the first two bytes $C_1$, $C_2$ of the subsequent cache line from the instruction cache 26 are fetched and added to bytes $B_3$–$B_8$. The process of determining the length of the next instruction is similar to that shown in FIG. 2B. The PLA 35a detects the length of the next instruction, byte $B_3$, and the boundary pattern 1 223 is appended to the boundary pattern 10 in control logic 36. The control logic 36 enables decoder 22a to serially process byte $B_3$. Again the control logic 36 sends the computed length of instruction $B_3$, 1, to control logic 38. As shown in FIG. 2D by byte $B_4$'s leftmost position in the set of instructions under aligner 42, byte $B_3$ is shifted out by prefetcher 21 and byte $C_3$ is fetched. PLA 35a then computes the length of the third instruction $B_4$–$B_6$ and obtains the boundary pattern 100, which indicates a length of three bytes. The boundary pattern 100 is added to control logic 36. The system still operates serially enabling only decoder 22a and feeding the length of 3 back to the prefetcher 21.

Figure 2E:
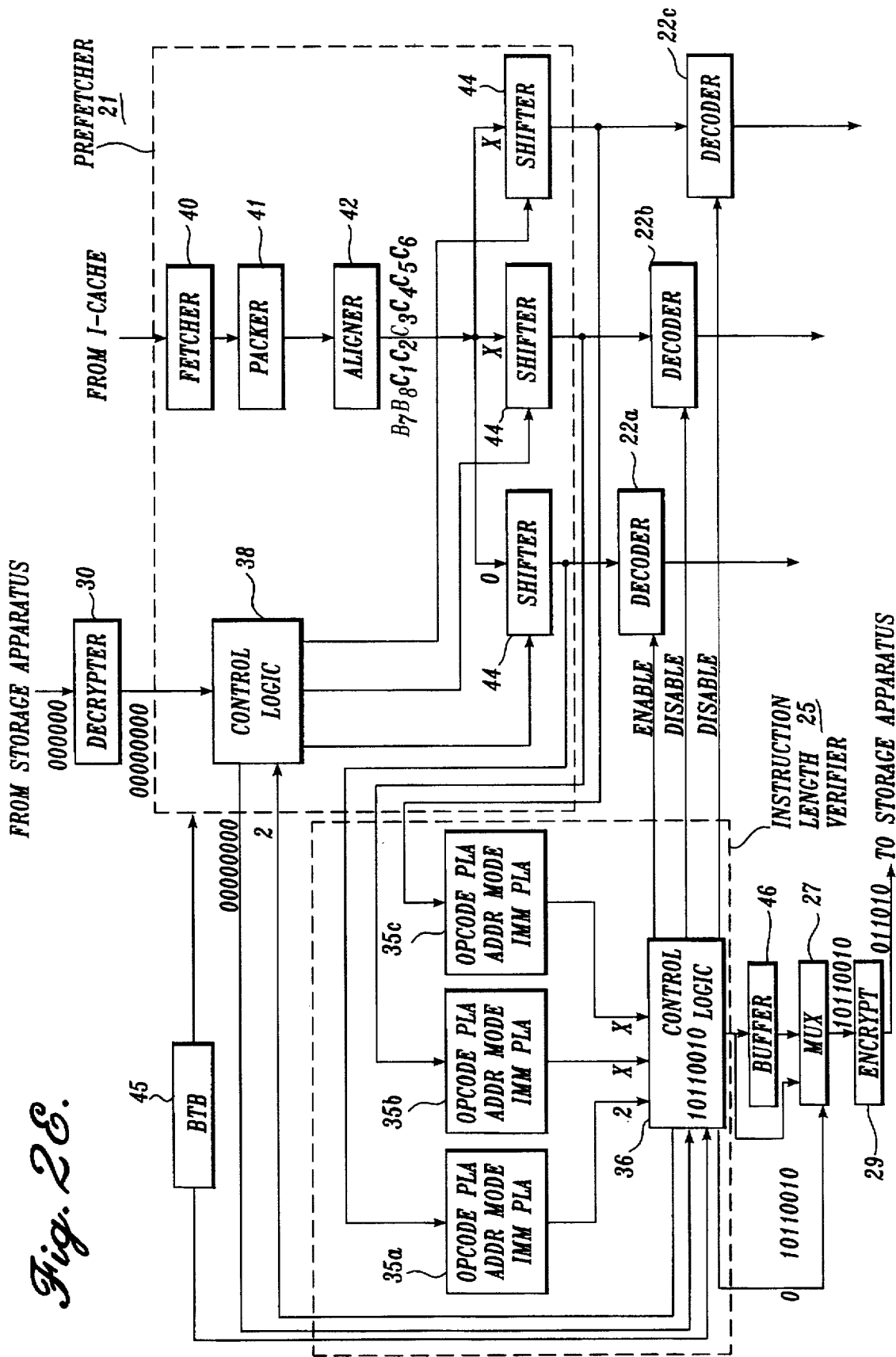
Figure 2H:
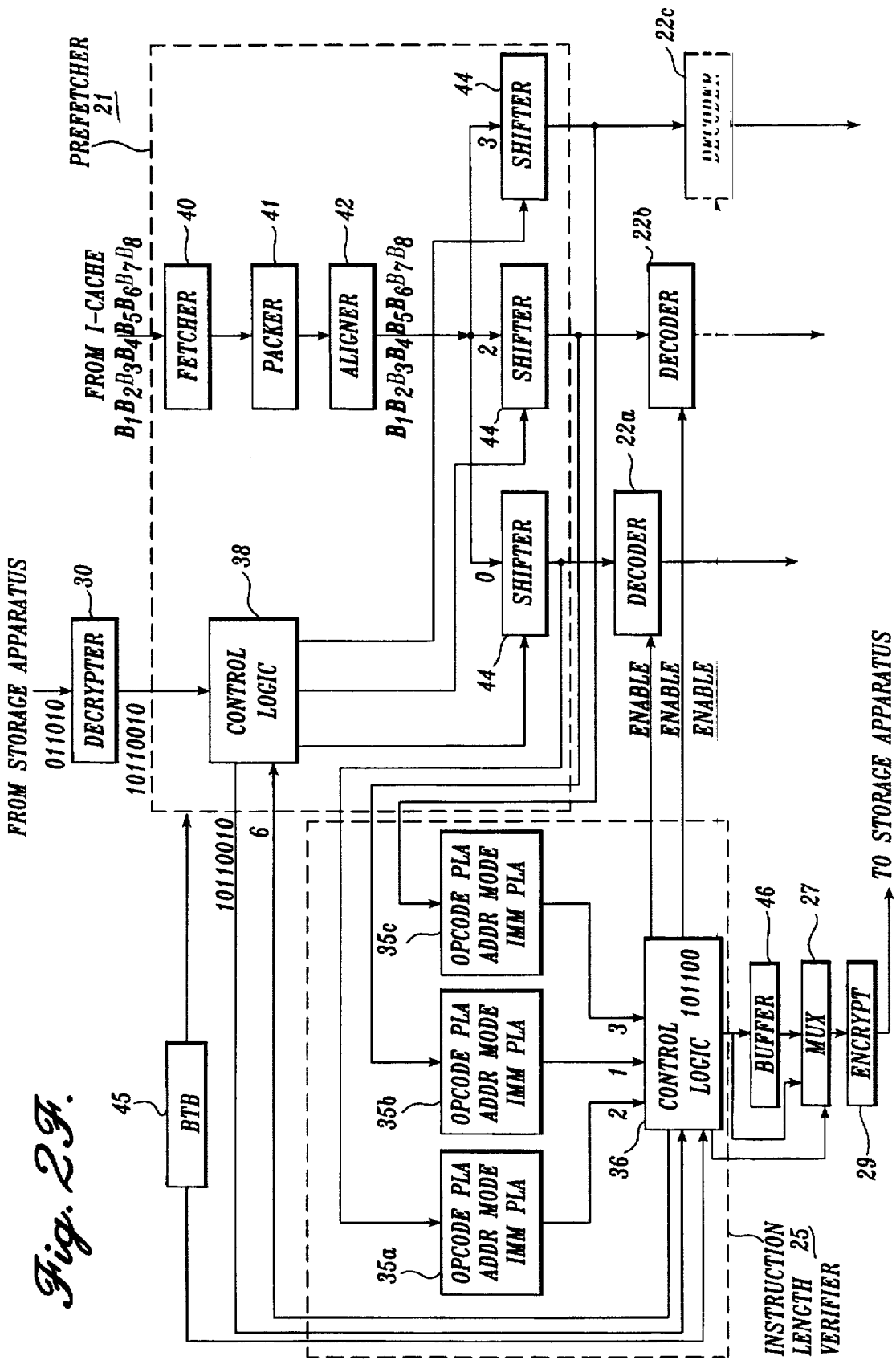

As shown in FIG. 2E by byte $B_7$'s leftmost location in the set of instructions shown under aligner 42, the third instruction $B_4$–$B_6$ are shifted out and $C_4$–$C_6$ are fetched. A boundary pattern (10) is computed by PLA 35a and fed to the control logic 36. Control logic 36 has now collected a complete eight bit boundary pattern (10110010). The eight bit boundary pattern is sent to buffer 46 and mux 27. Also, the control logic 36 issues a selection signal of 0 to the mux to enable the mux to send the boundary pattern to the encrypter 29. The encrypter 29 generates an encrypted pattern (011010) and stores the pattern in the storage apparatus 28. The type of encryption pattern used is determined by the architecture involved in the system and the frequency of use of various instructions. As such, encryption patterns may be very different from one computer to the next. The ILV 25 is informed of the storage location of the encrypted code in the storage apparatus 28. The storage location corresponds to the cache line the boundary pattern relates to in order for the encrypter 29 to know where to update the boundary pattern in the storage apparatus 28. The location information is obtained when the prefetcher 21 fetches a stored boundary pattern and the data words of a cache line.

The control logic 38 in the prefetcher 21 then forwards the location and boundary pattern to the ILV control logic 36 for update and verification.

FIG. 2F illustrates using the boundary pattern for decoding multiple instructions in parallel. The recorded boundary pattern (011010) is retrieved and decrypted by decrypter 30 as 10110010 and then sent to the prefetcher 21 and, from prefetcher 21 to ILV 25. Because three decoders 22a–c are employed by this embodiment, the control logic 38 parses the fetched data words $B_1$–$B_8$ according to the boundary pattern into three instructions, by left shifting two bytes in the data words to line $B_3$ up with decoder 22b and the corresponding shifter 44 in the prefetcher 21 and three bytes to line up $B_4$ of the third instruction with the decoder 22c. PLAs 35a–c concurrently compute the instruction lengths of the three parsed data words. The computed instruction lengths from the PLAs match those parsed by the prefetcher 21. Thus, the control logic 36 issues enabling signals to decoders 22a–c. Upon receiving the enabling signals, the decoders 22a–c concurrently decode the three instructions and send the decoded instructions to the dispatch logic 23 for further processing. As a result, three instructions are decoded in parallel. Also, the control logic 36 sends the combined length, six bytes, of the three successfully verified and processed instructions to prefetcher 21. According to the sent information of combined length of six bytes (i.e., the number "6"), the control logic 38 shifts six bytes. Parallel decoding of bytes $B_7$, $B_8$, bytes from the next cache line, and following cache lines continues as long as the instruction boundary pattern retrieved from the storage apparatus 28 matches that computed by the PLAs in the ILV 25. No update to storage apparatus required.

Figure 3B:
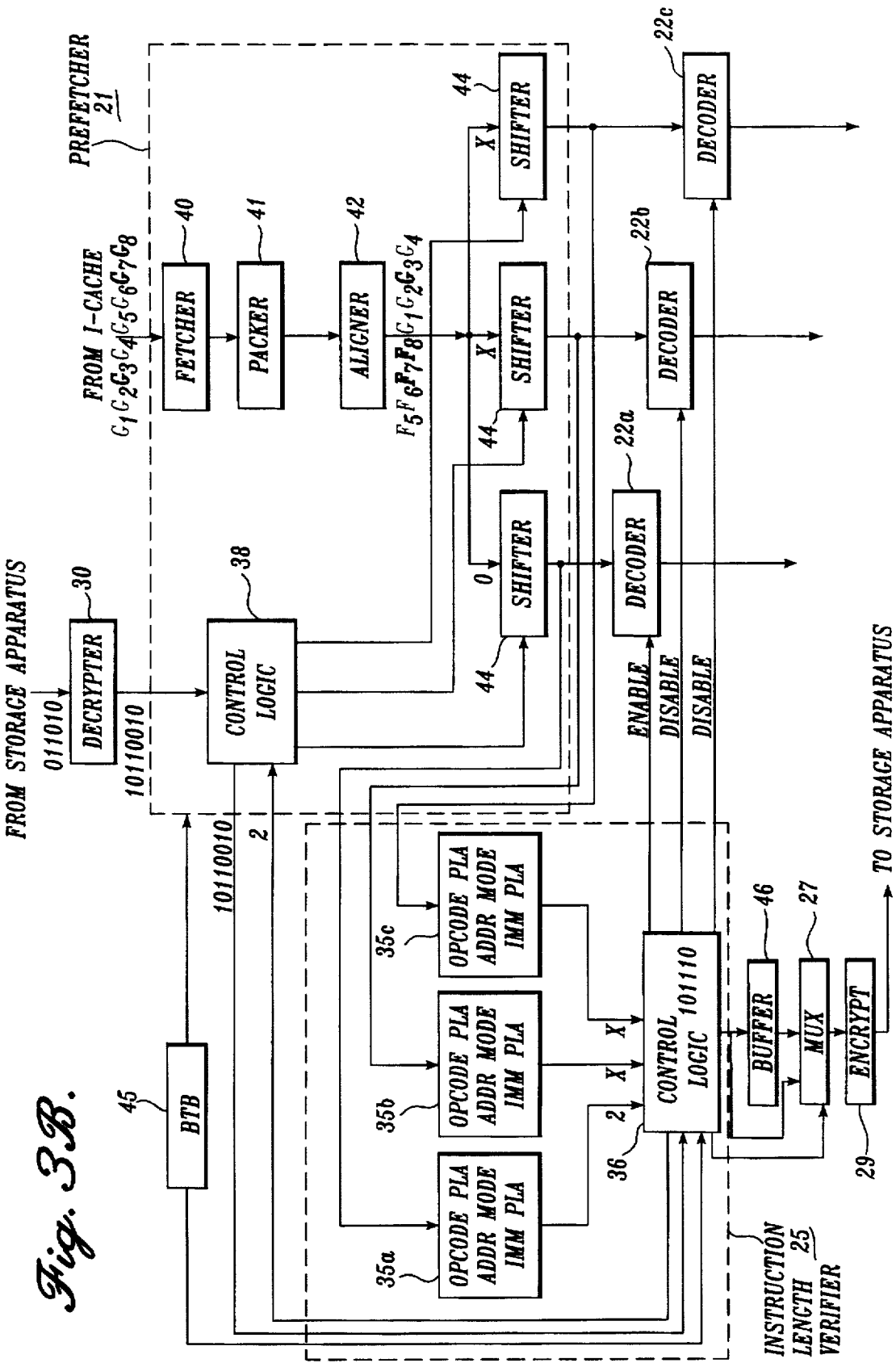
Figure 3E:
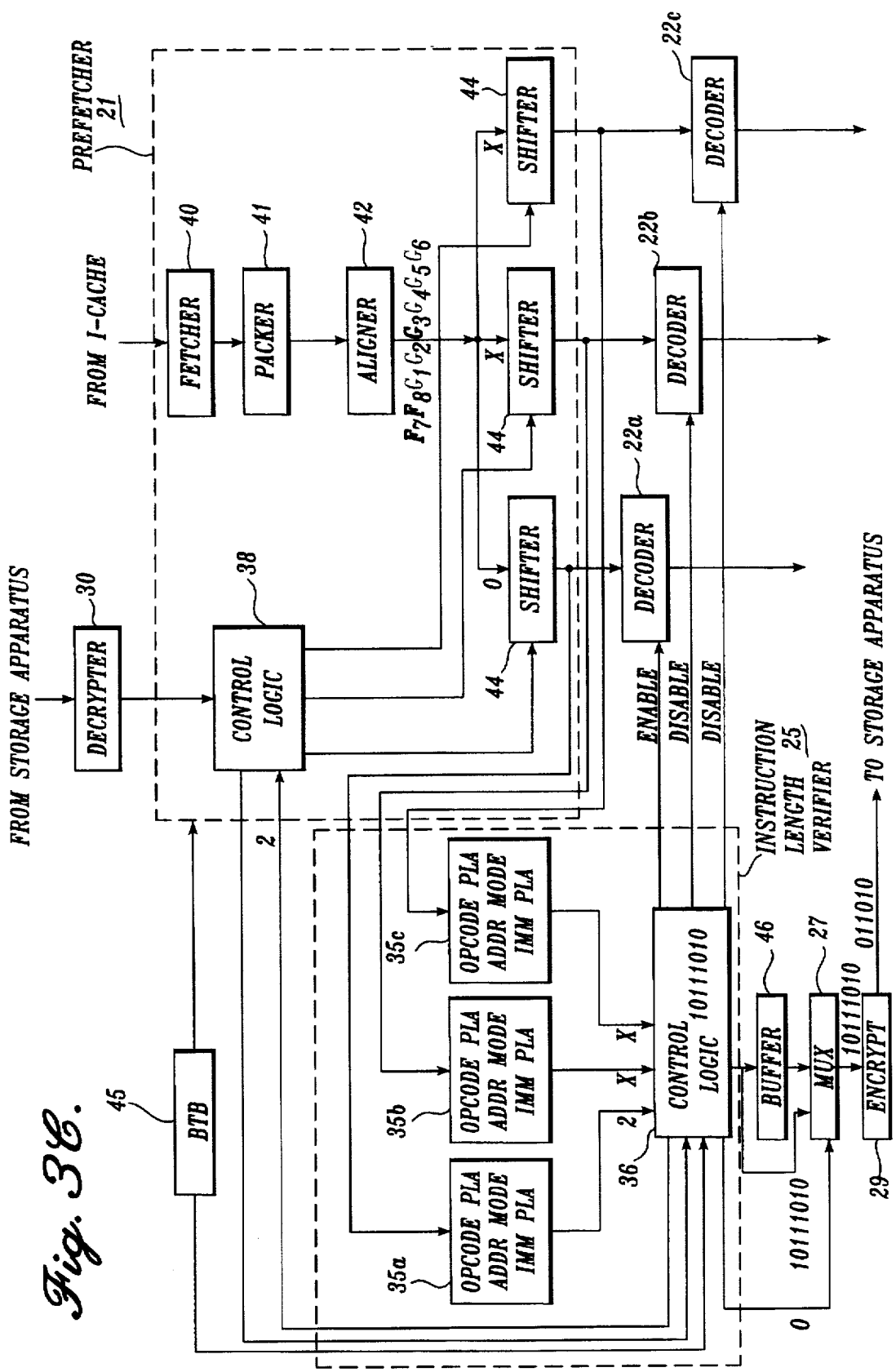

FIGS. 3A–C illustrate system recovery if a previously recorded boundary pattern is partially incorrect. As shown in FIG. 3A, the prefetcher 21 fetches a cache line of data words $F_1$–$F_8$ with a first instruction that occupies two bytes, $F_1$, $F_2$, a second instruction that occupies one byte, $F_3$, a third instruction that occupies one byte, $F_4$, a fourth instruction that occupies two bytes, $F_5$, $F_6$, and a fifth instruction that occupies two bytes, $F_7$, $F_8$. At the same time the cache line is fetched, the corresponding instruction boundary pattern (011010) is fetched, decrypted as 10110010, and sent to the prefetcher 21 and to the ILV 25 via control logic 38. According to the boundary pattern received, the control logic 38 parses the fetched data words $F_1$–$F_8$ into three instructions for the three decoders 22a–c. The data words left shift two bytes to line up the second instruction $F_3$ with the second decoder 22b and left shifts one more byte to line up the third instruction $F_4$, $F_5$, $F_6$ with the third decoder 22c. PLAs 35a–c compute the lengths of the three instructions parsed by the prefetcher 21. Control logic 36 issues enabling signals to decoders 22a–c since a match occurred between the computed instruction lengths and the boundary pattern of the first two instructions but a mismatch occurred with the third instruction. The actual length, 1 byte, of the third instruction is not equal to the boundary pattern 100, 3 bytes, fetched. Although a mismatch occurred in determining the length of the third instruction, the starting point of the third instruction is correct, thus justifying an enabling signal from control logic 36 to decoder 22c. The combined computed lengths of the three executed instructions, 4, is sent to prefetcher 21 for use with the next cycle. Also, instruction boundary pattern (1011) is collected by the ILV 25. The mismatch between the computed and recorded lengths of the third instruction indicates an invalidation of the remaining recorded boundary pattern for that cache line.

As shown in FIG. 3B, the prefetcher 21 discards the first four bytes, $F_1$–$F_4$, and adds bytes $G_1$–$G_4$ according to the combined length of four of the three previously processed instructions. Due to the error that occurred, processing must proceed serially. PLA 35a computes the byte length for the next instruction, $F_5$, $F_6$ and sends it to the prefetcher 21. The control logic 36 enables primary decoder 22a. The boundary pattern (10), corresponding to the computed length of two, is appended to the information already collected in the ILV 25.

As shown in FIG. 3C, the prefetcher 21 discards the two byte instruction of $F_5$, $F_6$ and adds two more bytes, $G_5$, $G_6$, according to the computed length of two received by the prefetcher 21. Once again, this instruction must be decoded serially. PLA 35a computes the length of the next instruction, $F_7$, $F_8$, as having two bytes. A pattern (10) is appended to the collected boundary pattern and an enabling signal is issued to the primary decoder 22a. The collected boundary pattern (10111010) is encrypted as 011010 before storing in storage apparatus 28.

Figure 4A:
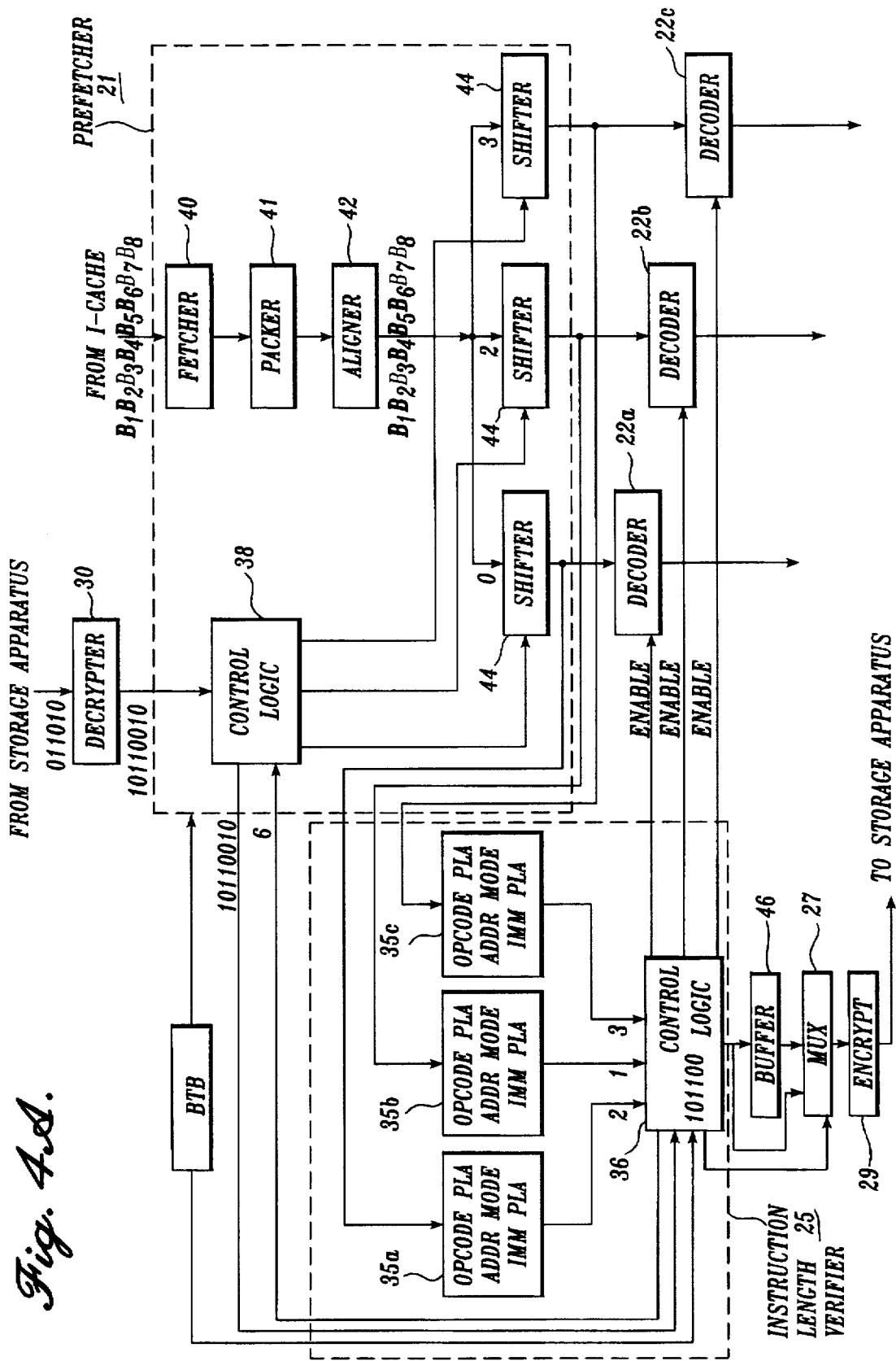
Figure 4C:
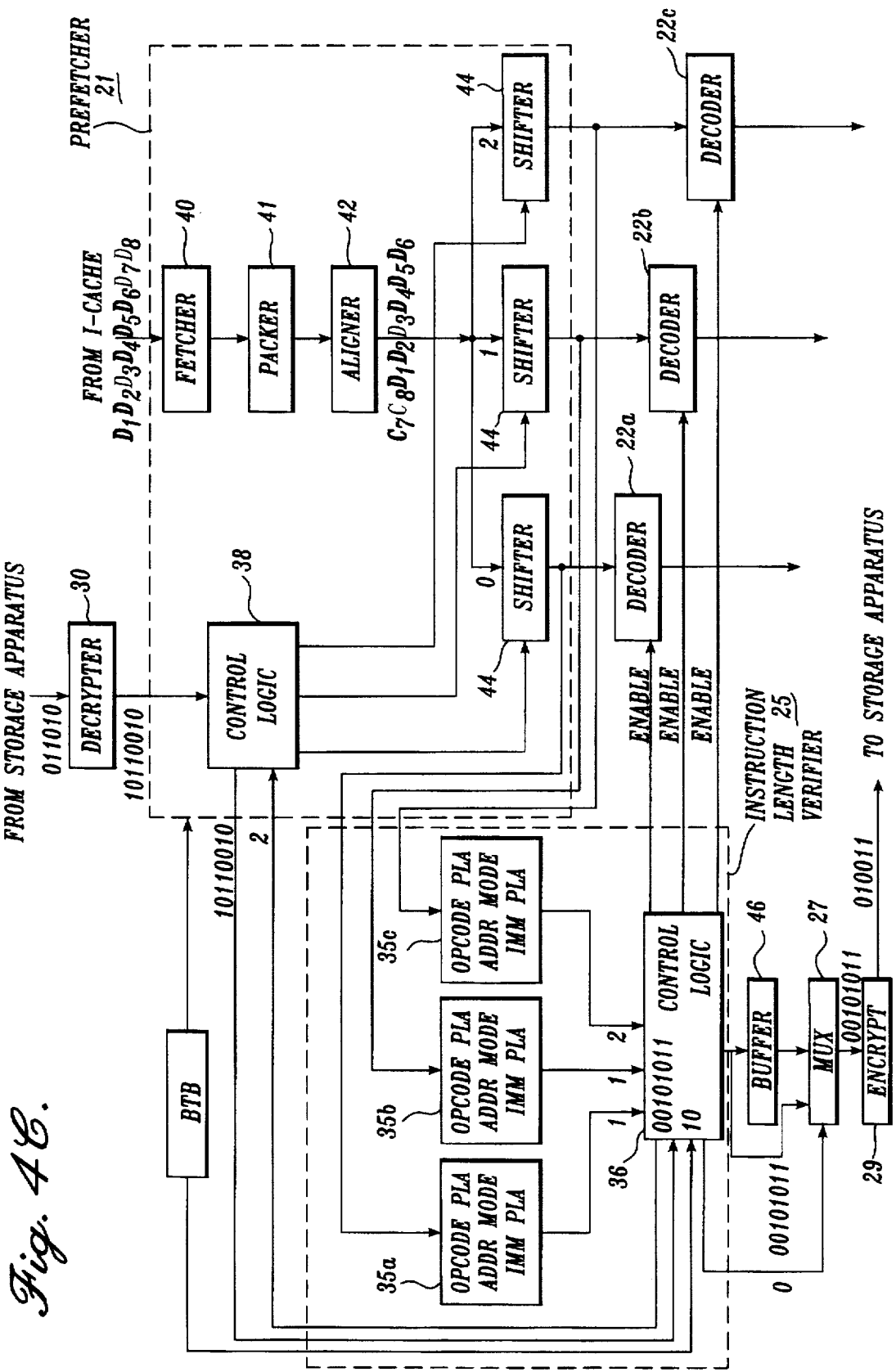

FIGS. 4A–C illustrate system operation when an instruction crosses a cache line boundary. As shown in FIG. 4A, the first three instructions fetched decode in parallel and the ILV 25 collects the instruction pattern 101100. After discarding the six bytes of the first three instructions, the prefetcher 21 adds another six bytes, $C_1$–$C_6$, from the subsequent cache line as shown in FIG. 4B. Also, the encrypted boundary pattern 010011 corresponding to the cache line $C_1$–$C_8$ is fetched and decrypted as 00101011. In this example, a four byte instruction, $B_7$, $B_8$, $C_1$, $C_2$, extends across the cache line boundary. Thus, the prefetcher 21 parses the data words according to boundary pattern from the previous and current cache lines (two bits (10) from the boundary pattern of the previous cache line and six bits (001010) from that of the current cache line). The ILV 25 computes and verifies the lengths of the three parsed instructions and enables the decoders 22a–c. The combined instruction boundary pattern is now a complete eight bit boundary pattern (10110010) and thus ready for encrypting and storing in the storage apparatus 28. The computed total length of the three decoded instructions is eight bytes. The prefetcher 21 discards bytes $B_7$–$C_6$ and adds $C_7$, $C_8$, and $D_1$–$D_6$ from the next cache line according to the computed total length. Similarly, as before, according to retrieved boundary pattern, the control logic 38 parses the data words and positions them properly, as shown in FIG. 4C. The ILV 25 computes the parsed instructions' lengths, verifies their correctness and issues enabling signals to the decoders accordingly. Once again, another eight bit boundary pattern (00101011) is collected and ready for encryption and storage into the storage apparatus 28.

Figure 5A:
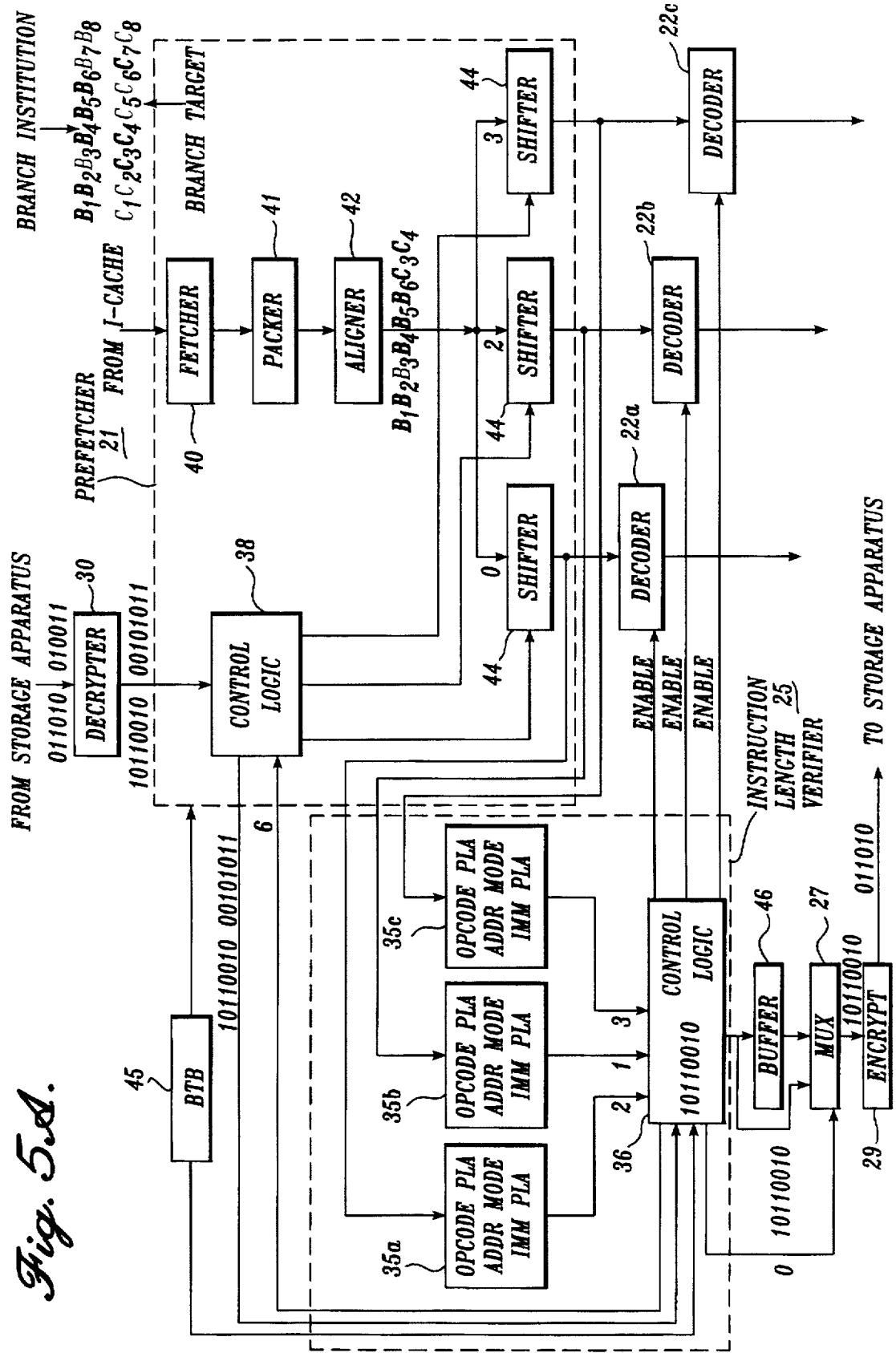
Figure 5B:
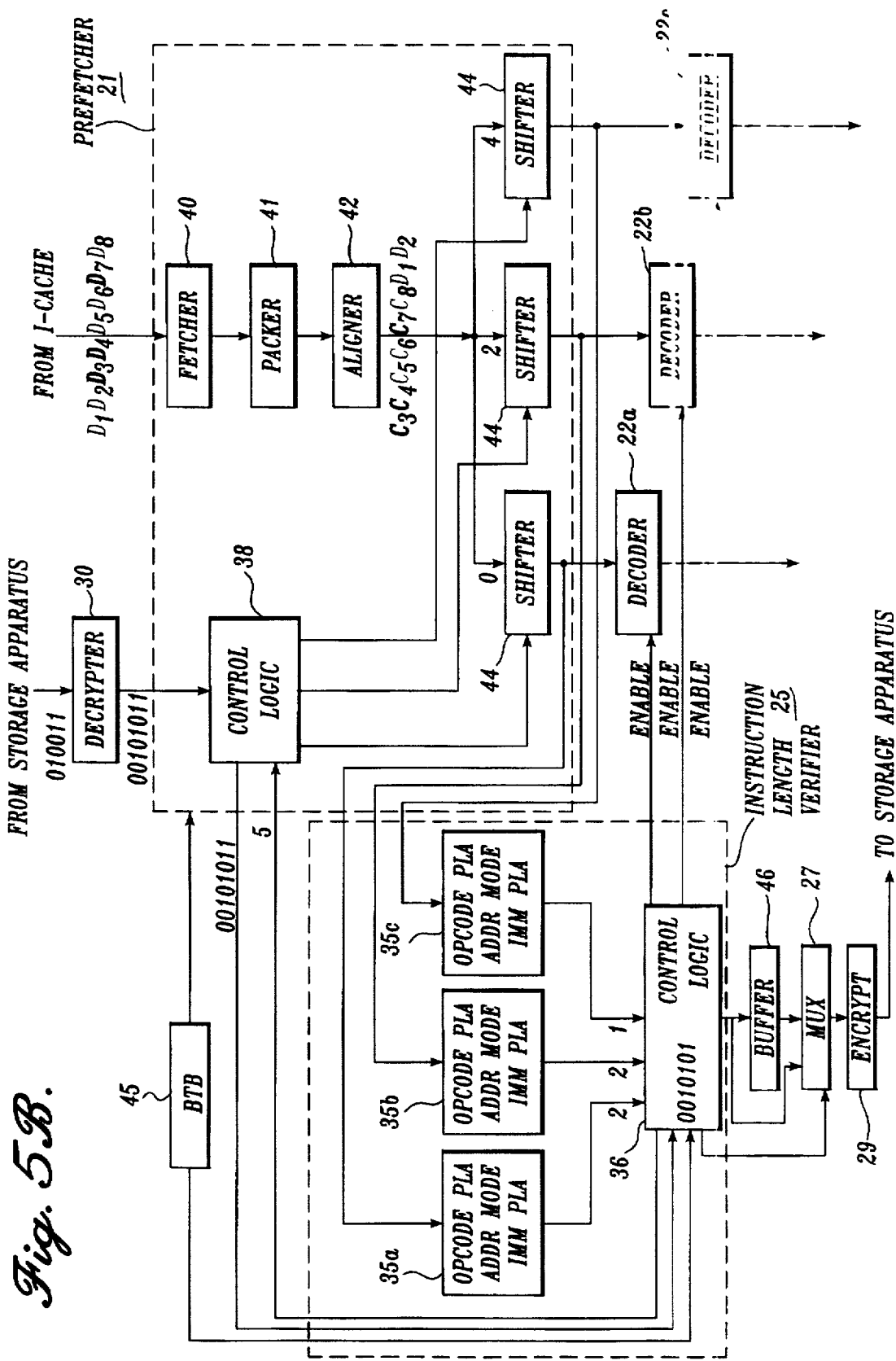
Figure 5C:
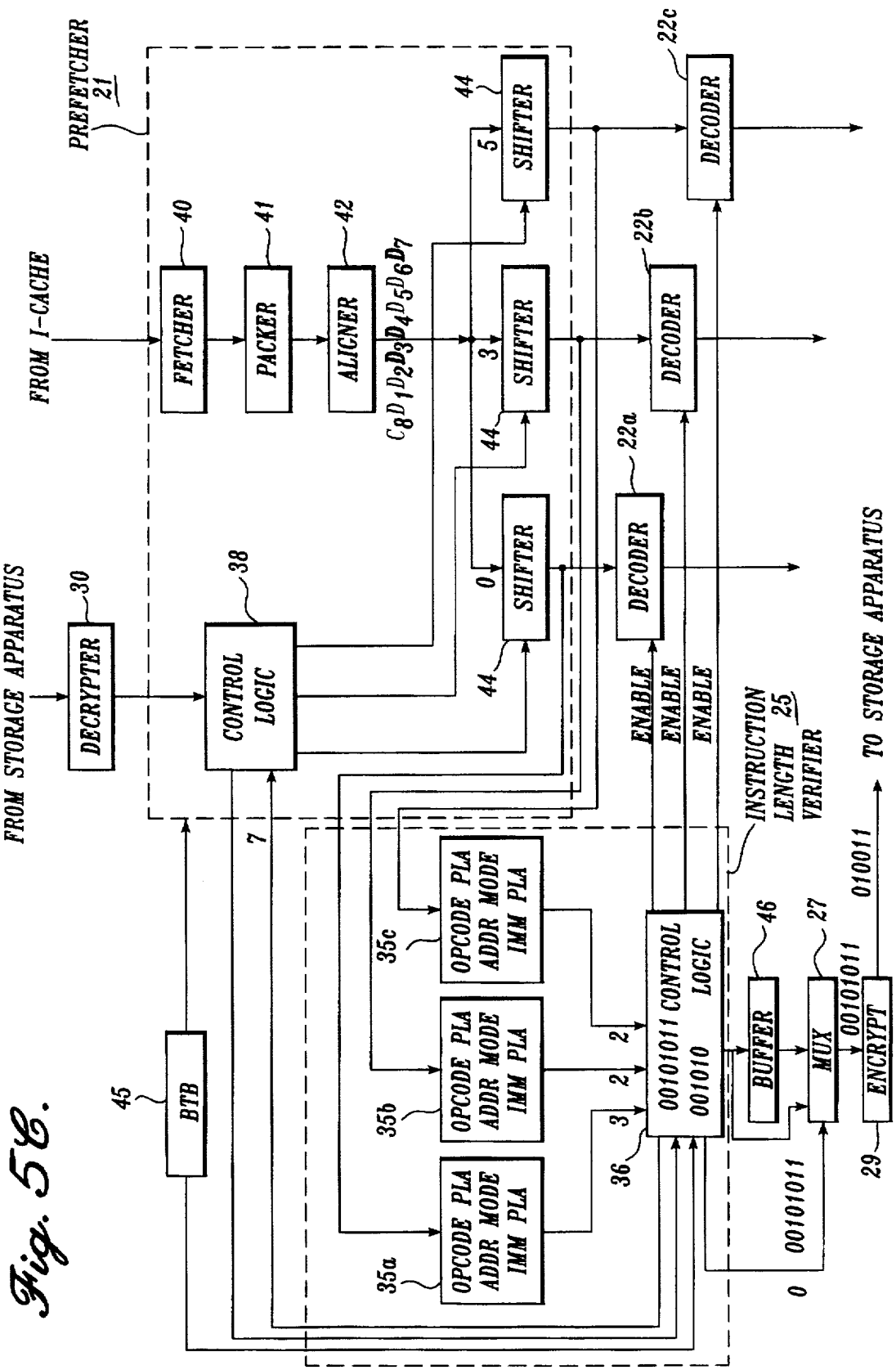

FIGS. 5A–C illustrate system operation when a branch instruction is encountered. As shown in FIG. 5A, the prefetcher 21 fetches data words $B_1$–$B_8$ prompting the BTB 45 with an instruction address to detect a branch instruction, $B_1$–$B_6$, at the instruction address, speculate the branch target instruction of the branch instruction, and direct the prefetcher 21 to fetch the next set of data words starting at the branch target. Incorrect BTB 45 branch speculating results in errors that are eventually filtered out, see FIGS. 5A–C. Since the prefetcher 21 must parse instructions from two different cache lines, the corresponding boundary patterns of the two cache lines are decrypted and retrieved. Although the data words come from different cache lines, the control logic 38 parses those data words according to their corresponding boundary pattern. The ILV 25 then computes and verifies the instruction lengths and enables decoders 22a–c, if the verification for the parsed instructions was correct. The boundary pattern of bytes $B_1$–$B_6$ combines with the remaining two bits obtained from the storage apparatus 28 to generate a complete eight bit boundary pattern (10110010). The complete eight bit boundary pattern is then encrypted and written back to the storage apparatus 28. The prefetcher 21 receives the information of a total combined length of six bytes (i.e., the number "6") from control logic 36 and then removes bytes $B_1$–$B_6$ and adds bytes $C_5$–$C_8$, $D_1$, $D_2$, as shown in FIG. 5B. Since bytes $C_1$ and $C_2$ go unused, their boundary patterns are combined with the boundary patterns of the next three instructions bytes $C_3$–$C_7$. As a result, seven bits of boundary pattern 0010101 are collected in control logic 36. Bytes $C_3$–$C_7$ are decoded with a combined total length of five bytes which is used for the next set of data words.

As shown in FIG. 5C, the prefetcher 21 removes and fetches five bytes according to the combined total length received at control logic 38. The remaining bytes $C_8$, $D_1$–$D_7$ are verified and decoded as previously discussed.

Figure 6A:
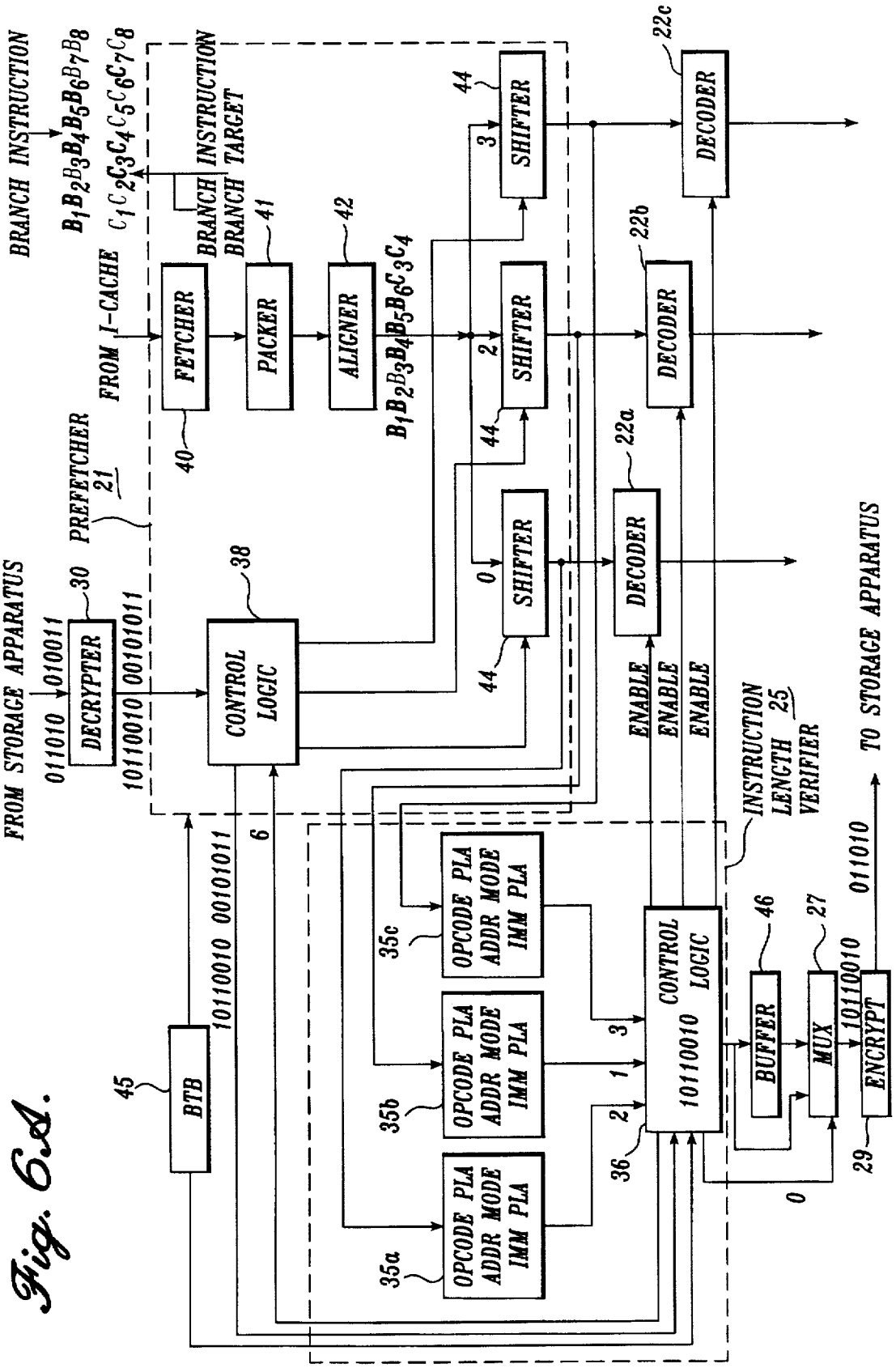
Figure 6C:
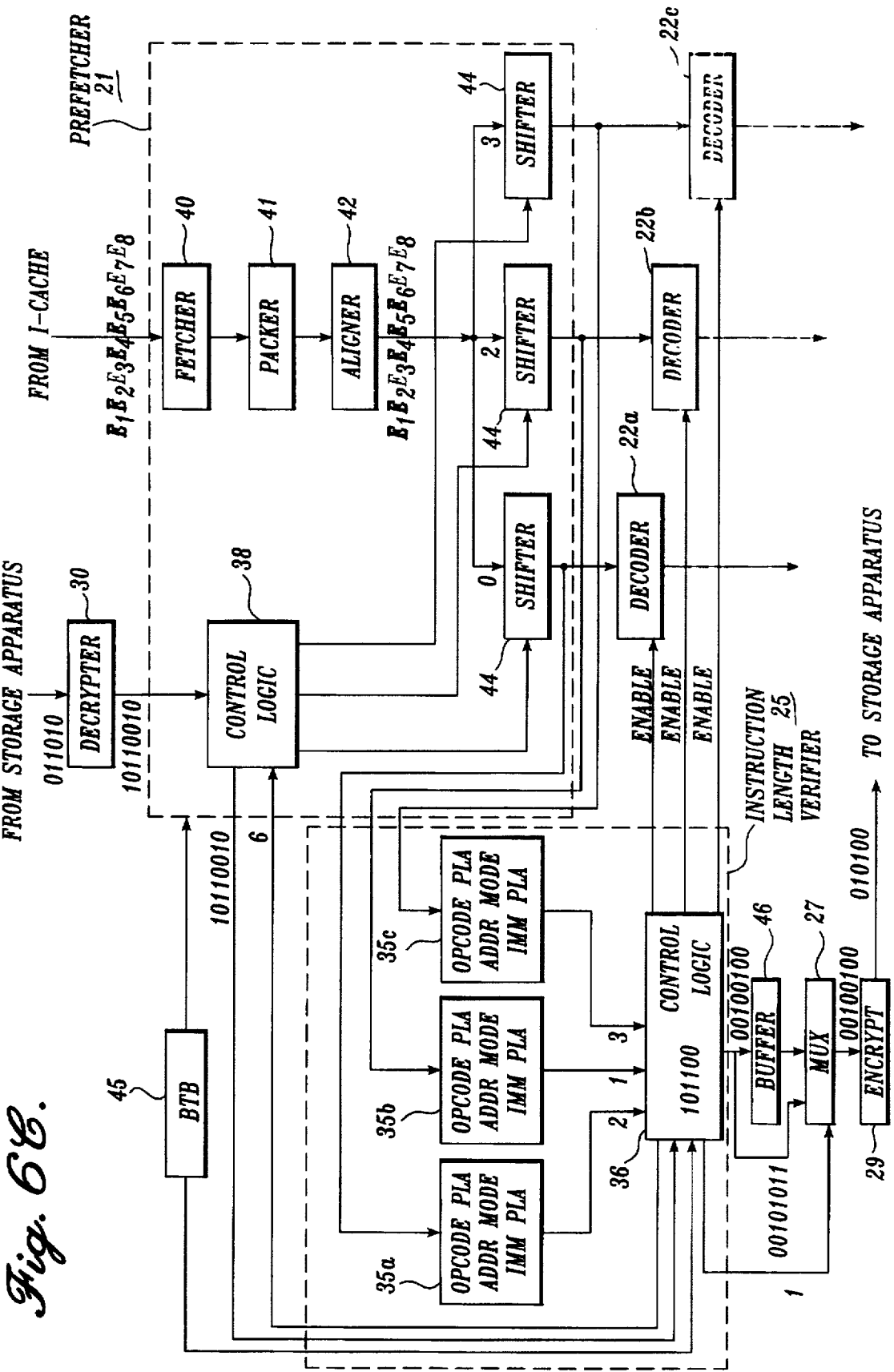

FIGS. 6A–C illustrate system operation when nested branch instructions are encountered. Bytes $B_4$–$B_6$ constitute a branch instruction with a target byte $C_3$. Also, bytes $C_3$ and $C_4$ constitute another branch instruction with a target byte $D_3$. When the prefetcher 21 fetches cache line $B_1$–$B_8$, the BTB 45 detects the branch instruction $B_4$–$B_6$, speculates its target, and directs the fetcher 40 to fetch the target $C_3$. Again when cache line $C_3$–$C_8$ is fetched, the BTB 45 detects the other branch instruction, speculates its target and directs the fetcher 40 to fetch from byte $D_3$. The instruction boundary pattern is fetched and decoded as the corresponding data words are fetched. The ILV 25 enables the decoders 22a–c after the length computing and verifying process. Since only six bytes $B_1$–$B_6$ are used, their boundary patterns combine with the remaining 2-bit pattern fetched from the storage apparatus 28, thus generating a complete 8-bit boundary pattern (10110010) which is encrypted as 011010 and written back to the storage apparatus 28. The information of a combined total length of six bytes (i.e., the number "6") is forwarded to prefetcher 21. Again, the control logic 36 in the ILV issues a selection signal of 0 to the MUX 27, to route the information to the encrypter 29.

As shown in FIG. 6B, the prefetcher removes 6 bytes $B_1$–$B_6$ and adds another 6 bytes $D_3$–$D_8$. The ILV 25 enables the decoders 22a–c. Since only two bytes in cache line C are used, their boundary pattern is combined with the six unused bits corresponding to $C_1$–$C_2$ and $C_5$–$C_8$, fetched and decrypted from the storage apparatus 28. Similarly, since only six bytes in cache D are used, their boundary pattern is combined with those unused two bits which correspond to $D_1$ and $D_2$. Since there is boundary pattern corresponding to two cache lines, the control logic 36 sends the boundary pattern 00101011 for cache line $C_1$–$C_8$ to the MUX 27 and temporarily stores the information 00100100 in the buffer 46. A combined length eight of the processed instructions $C_3$, $C_4$, $D_3$–$D_8$ (i.e., the number "8") is forwarded to the prefetcher 21. Again, the control logic 36 in the ILV 25 issues a selection signal of 0 to the MUX 27, to route the information to the encrypter 29.

As shown in FIG. 6C, the prefetcher 21 and the ILV 25 work similarly as before, except that the control logic 36 issues a selection signal of 1 to the MUX 27 to route the boundary pattern in buffer 46 to the encrypter 29. The boundary pattern 00100100 is then encrypted as 010100 and written back to the storage apparatus 28. The information of a combined length of six bytes (i.e., the number "6") is forwarded to the prefetcher 21.

Though only single situation examples of fundamental operations are demonstrated, any combination of them is possible. Operations become very complicated when several operations occur at the same time. The present invention is capable of handling all possible cases, whether simple or complicated. Note that the buffer in the prefetcher 21 must be large enough to hold the maximum permissible length of instructions to occupy. Also note that since instructions are correctly verified, it is not necessary to update the storage apparatus again by the control logic in the verifier, as illustrated in the examples.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for decoding instructions in parallel in a computer system, wherein the computer system includes an instruction cache, a boundary pattern storage, an encrypter, a decrypter, a prefetcher and two or more decoders, said method comprising the steps of:
   (a) fetching a set of instructions and a corresponding instruction boundary pattern code from the boundary pattern storage;
   (b) decrypting the fetched instruction boundary pattern code into instruction boundary patterns according to a predetermined criteria;
   (b) generating instruction boundary patterns according to said fetched set of instructions, if the corresponding instruction boundary pattern contains no pattern information, encrypting said generated instruction boundary patterns into instruction boundary pattern code according to the predetermined criteria, storing said encrypted instruction boundary pattern code in the boundary pattern storage and decoding the instructions in the set of instructions serially according to said generated instruction boundary patterns;
   (c) separating the set of instructions according to said corresponding instruction boundary pattern, if the corresponding instruction boundary pattern contains pattern information, verifying if the separated instruction signals were separated correctly, decoding the correctly separated set of instructions in parallel, if the verification was correct, and decoding the instructions subsequent to an incorrectly verified instruction serially, if the verification is incorrect.

2. The method of claim 1, wherein the step of fetching further comprises a step of identifying branch instructions in the fetched set of instructions, determining the target instruction of the identified branch instructions and fetching the target instruction and a corresponding instruction boundary pattern code from the boundary pattern storage.

3. The method of claim 1, wherein the set of instructions includes at least one instruction of at least one byte in length.

4. The method of claim 2, wherein the instructions are variable in length.

5. A computer data processing system for decoding instructions in parallel, said system further comprising:
   (a) a means for fetching a set of instruction signals and a corresponding instruction boundary pattern code from the boundary pattern storage;
   (b) a means for decrypting the fetched instruction boundary pattern code into instruction boundary patterns;
   (b) a means for generating instruction boundary patterns according to said fetched set of instructions, if the corresponding instruction boundary pattern contains no pattern information, encrypting said generated instruction boundary patterns into instruction boundary pattern code according to a predetermined criteria, storing said encrypted instruction boundary pattern code in the boundary pattern storage and decoding the instructions in the set of instructions serially according to said generated instruction boundary patterns;
   (c) a means for separating the set of instructions according to said corresponding instruction boundary pattern, if the corresponding instruction boundary pattern contains pattern information, verifying if the separated instruction signals were separated correctly, decoding the correctly separated set of instructions in parallel, if the verification was correct, and decoding the instructions subsequent to an incorrectly verified instruction serially, if the verification is incorrect.

6. The system of claim 5, wherein the means for fetching further comprises a means for identifying branch instructions in the fetched set of instructions, determining the target instruction of the identified branch instructions and fetching the target instruction and a corresponding instruction boundary pattern code from the boundary pattern storage.

7. The system of claim 5, wherein the set of instructions includes at least one instruction of at least one byte in length.

8. The system of claim 5, wherein the instructions are variable in length.

9. A computer data processing system for decoding instructions in parallel, including a cache for storing instructions, said system comprising:
   a prefetcher for receiving sets of instructions from the cache and separating instructions in the set of instructions;
   an instruction length verifier, in communication with said prefetcher, for generating instruction boundary pattern code and verifying the length of said separated instruction signals;
   a means, in communication with said instruction length verifier, for encrypting and storing the generated instruction boundary pattern code; and
   a means for decrypting the stored encrypted instruction code from said means for encrypting and storing.

10. The system of claim 9, wherein the prefetcher fetches a set of instructions comprising at least one instruction from said cache and corresponding instruction boundary pattern from the means for storing through the decrypting means;
    if the corresponding instruction boundary pattern contained no pattern information, the instruction length verifier generates instruction boundary patterns according to said fetched set of instructions;
    the means for encrypting encrypts said generated instruction boundary patterns according to a predetermined criteria and the means for storing stores said encrypted instruction boundary patterns; and
    the prefetcher transmits the instructions in the set of instructions serially;
    if the corresponding instruction boundary pattern contains pattern information, the prefetcher separates the set of instructions into instructions according to said corresponding instruction boundary pattern;
    said instruction length verifier verifies if the separated instruction signals were separated correctly; and
    if the verification was correct, the prefetcher transmits the correctly separated instructions in parallel over different output lines for parallel decoding, and if the verification is incorrect, the prefetcher transmits instructions subsequent to an incorrectly verified instruction serially according to instruction length verifier.

11. The system of claim 10, wherein the at least one instruction is at least one byte in length.

12. The system of claim 10, wherein said storage means is a cache memory device.

13. The system of claim 10, wherein the instructions are variable in length.

14. The system of claim 10, wherein said prefetcher further comprises:

a packer for tightly packing instructions; and an aligner and control logic for controlling separation of the instruction signal.

* * * * *

UNITED STATES PATENT AND TRADEMARK OFFICE
CERTIFICATE OF CORRECTION

PATENT NO. : 5,724,422
DATED : March 3, 1998
INVENTOR(S) : S. Shang et al.

It is certified that error appears in the above-identified patent and that said Letters Patent is hereby corrected as shown below:

| COLUMN | LINE | |
|---|---|---|
| [56]<br>Pg. 1, col. 1 | Refs. Cited<br>(U.S. Pat.<br>Docs., Item 8) | "Oguru" should read --Ogura-- |
| 9<br>(Claim 1, | 27<br>line 12) | "(b) generating" should read --(c) generating-- |
| 9<br>(Claim 1, | 37<br>line 22) | "(c) separating" should read --(d) separating-- |
| 9<br>(Claim 5, | 62<br>line 8) | "(b) a means for generating" should read<br>--(c) a means for generating-- |
| 10<br>(Claim 5, | 5<br>line 18) | "(c) a means for separating" should read<br>--(d) a means for separating-- |

Signed and Sealed this

Sixteenth Day of June, 1998

*Attest:*

BRUCE LEHMAN

*Attesting Officer*    *Commissioner of Patents and Trademarks*